US006534959B1

(12) United States Patent
Anderson et al.

(10) Patent No.: US 6,534,959 B1
(45) Date of Patent: Mar. 18, 2003

(54) VOLTAGE SENSING FOR AUTOMOTIVE VOLTAGE REGULATOR

(75) Inventors: Stephen Wayne Anderson, Anderson, IN (US); Paschal J. Romano, Fenton, MI (US); Lary Robert Hocken, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 09/943,694

(22) Filed: Aug. 31, 2001

(51) Int. Cl.[7] ................................................. H02P 9/10
(52) U.S. Cl. ............................. 322/28; 322/27; 322/59
(58) Field of Search ........................... 322/7, 25, 26, 322/27, 28, 29, 59

(56) References Cited

U.S. PATENT DOCUMENTS

| | | | |
|---|---|---|---|
| 4,316,134 A | | 2/1982 | Balan et al. ............... 322/99 |
| 4,379,990 A | | 4/1983 | Sievers et al. ............. 322/99 |
| 4,451,776 A | * | 5/1984 | Iwaki et al. ............... 322/22 |
| 4,812,732 A | | 3/1989 | Iwatani ..................... 322/99 |
| 4,862,055 A | | 8/1989 | Maruyama et al. .......... 322/8 |
| 5,013,991 A | * | 5/1991 | Brune ...................... 320/125 |
| 5,262,711 A | * | 11/1993 | Mori et al. ................ 322/28 |
| 5,448,154 A | * | 9/1995 | Kanke et al. .............. 322/28 |
| 5,497,071 A | * | 3/1996 | Iwatani et al. ............. 322/28 |
| 5,510,695 A | * | 4/1996 | Tanaka et al. ............. 322/25 |
| 5,617,014 A | | 4/1997 | Danstrom .................. 323/267 |
| 5,920,183 A | | 7/1999 | Null ......................... 323/312 |
| 5,998,880 A | * | 12/1999 | Kumar ..................... 290/40 B |
| 6,031,363 A | | 2/2000 | Danstrom et al. .......... 323/273 |
| 6,121,757 A | * | 9/2000 | Takahashi et al. .......... 322/28 |
| 6,147,474 A | * | 11/2000 | Koss et al. ................ 322/59 |
| 6,271,649 B1 | * | 8/2001 | Iwatani ..................... 322/29 |

* cited by examiner

*Primary Examiner*—Nicholas Ponomarenko
(74) *Attorney, Agent, or Firm*—Margaret A. Dobrowitsky (57) ABSTRACT

A voltage regulator for control of a vehicle generator. The voltage regulator is selectably responsive to a voltage representing the generator output voltage at the alternator output terminal, or to an external voltage sensed at a load or source point on the vehicle. The voltage regulator determines the relationship between these two sensed voltages and in response thereto chooses one of the sensed voltages for use in controlling the generator output by controlling the field excitation current input thereto. Certain conditions also cause the voltage regulator to latch in a mode where it is controlled only by one of the alternator output terminal voltage or the external voltage. Manual resetting may be required to discontinue the latched operational mode.

17 Claims, 6 Drawing Sheets

VOLTAGE SENSING FOR AUTOMOTIVE VOLTAGE REGULATOR

BACKGROUND OF THE INVENTION

This invention relates generally to an apparatus and method for controlling an automotive generator, and more specifically to an apparatus and method for selectably choosing a point for sensing the output voltage from the generator.

Voltage regulator controlled automotive battery charging systems are commonly used to keep an automotive storage battery at full charge level and to provide sufficient electrical power for the operation of the various automobile electrical accessories. In a conventional motor vehicle, the electrical energy is generated by a generator driven by means of a belt-and-pulley arrangement coupled to the internal combustion engine of the automobile. The generator includes a field winding, a three-phase stator winding, and a full-wave diode bridge rectifier for converting the polyphase AC output of the windings to a DC output voltage for supplying various vehicle loads, including the vehicle battery. The voltage regulator associated with the generator controls the field coil excitation by controlling the current supplied (from a current source) to the field winding, to thereby control the DC output voltage to a desired value, which in turn ensures that the battery voltage is maintained at the desired level.

This control of the DC output voltage is effectuated by a feedback loop for measuring the generator output voltage or the actual battery voltage, and based on this value, controlling the field excitation current supplied to the generator field winding to bring the DC output voltage to the desired magnitude. Since the objective of the automobile charging system is to maintain the battery voltage at a predetermined value, it is preferable to measure the sensed battery voltage, rather than the generator output voltage, and use the sensed value to control the field current excitation. The generator output voltage can be measured at the DC output terminal of the generator and the battery voltage can be sensed at the battery, or at another point in the vehicle's electrical system proximate the battery. If the latter technique is used, so called external sensing, it is critical that the externally sensed voltage accurately represent the battery voltage. If the external sense voltage point develops a high resistance due to corrosion or grime, or if unwanted resistances appear in the conductor between the external sense point and the voltage regulator terminal, the voltage drop caused thereby provides a false reading as to the actual battery voltage. In turn, the false voltage reading signals the generator to unnecessarily increase the DC voltage output. In situations where the generator output voltage is increased above its nominal value, the generator and the other vehicle components to which it supplies a voltage can be damaged. In certain especially egregious situations, the high resistance and attendant voltage drop can raise the alternator output voltage to 18 to 21 volts. Generally, the output voltage from the alternator should never exceed 16 volts. Above this level, fuses may blow and other vehicle components may be damaged. Further, output voltages at this level may ruin the battery by boiling it dry.

BRIEF SUMMARY OF THE INVENTION

The disadvantages of the prior art technique wherein the feedback loop can cause the generator output voltage to exceed a nominal value due to a false measurement of the battery voltage, caused by unexpected resistances in the circuit to an external voltage sensing point, are overcome by the present invention. The apparatus and method of the present invention determines whether to use the generator output voltage (internal sense) or the battery voltage at an external sense point to control the field excitation current to the alternator.

The present invention senses the voltage at both the generator output terminal (internal sense) and the external terminal and compares these two values. If the external sense value is less than a predetermined absolute threshold low voltage, then a failsoft condition is detected and the voltage regulator begins sensing from the internal sensed point. Also, if the external sense voltage is less than the difference between the internal sensed voltage and a predetermined offset threshold low voltage, then a failsoft condition is also detected. If the external sensed point voltage is greater than a predetermined absolute threshold high voltage and greater than the difference between the internal sensed terminal voltage and a predetermined offset high threshold value then sensing from the external sense point is permitted.

The voltage regulator operates in the conventional manner when sensing voltage from the generator output terminal (internal sense). That is, if the generator output voltage at the sensed point exceeds a predetermined value, the voltage regulator changes the duty cycle of the current supplied to the field winding to a minimum value to decrease the generator output voltage. If the voltage at the generator output terminal goes above a second output voltage threshold, the regulator switches off the field excitation current. If the generator output voltage remains above the second output threshold value for longer than a predetermined time, then the regulator provides a fault indication to the vehicle operator.

The voltage regulator of the present invention also includes a failsafe condition that exists when the voltage regulator is sensing from the external terminal and the internal sense point exceeds a failsafe threshold voltage. Under these conditions, the voltage regulator uses the internal sense point and latches in a failsafe mode.

BRIEF DESCRIPTION OF THE DRAWINGS

The present invention may be better understood and the further uses and advantages thereof more readily apparent when considered in conjunction with the following figures, in which.

DETAILED DESCRIPTION OF THE PREFERRED EMBODIMENTS

Before describing in detail the particular voltage regulation mechanism in accordance with the present invention, it should be observed that the present invention resides primarily in a novel combination of processing steps and hardware related to a method and apparatus for improved voltage regulation of a vehicle generator. Accordingly, these processing steps and hardware components have been represented by conventional processes and elements in the drawings, showing only those specific details that are pertinent to the present invention so as not to obscure the disclosure with structural details that would be readily apparent to those skilled in the art having the benefit of the description herein.

Figure 1:
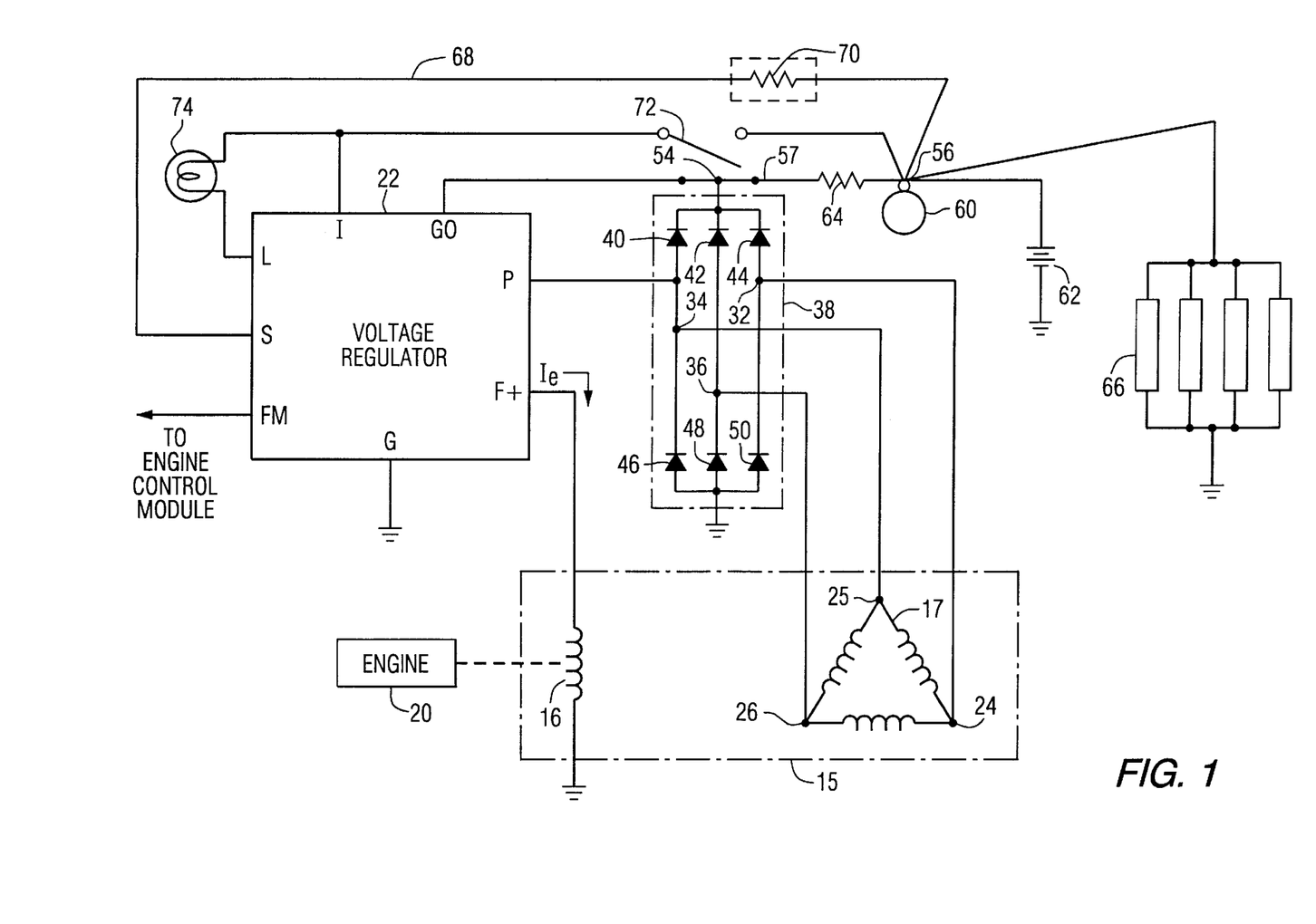
FIG. 1 is a schematic diagram illustrating the teachings of the present invention.

Reference numeral 15 designates a synchronous alternator having a rotor 16 and three-phase delta-connected stator winding 17. The rotor 16 is driven at a variable speed by a belt and pulley arrangement connected to an engine 20 on a motor vehicle. The rotor 16 is also referred to as the field coil. A field excitation current $I_e$ is supplied by a current source to an F+ terminal (also referred to as the field+ terminal) of a voltage regulator 22 to establish the magnetization of the rotor 16. As the rotor rotates, an alternating voltage is induced or generated in the stator winding 17. The frequency of the alternating voltage is directly proportional to the rotation speed of the rotor 16. The magnitude or amplitude of this voltage is a function of rotor speed and the field excitation current $I_e$. The field excitation current is controlled by any one of a number of well known alternatives for maintaining the output voltage of the generator at a desired value, for example 14 volts.

The output terminals 24, 25 and 26 of the stator winding 17 are connected respectively to input terminals 32, 34 and 36 of a bridge rectifier 38. The terminal 32 is connected to an anode terminal of a diode 44 and to a cathode terminal of a diode 50. The terminal 34 is connected to an anode terminal of a diode 40 and a cathode terminal of a diode 46. Finally, the terminal 36 is connected to an anode terminal of a diode 42 and a cathode terminal of a diode 48. The cathode terminals of the diodes 40, 42 and 44 are connected to a terminal 54. The anode terminals of the diodes 46, 48 and 50 are connected to ground. The bridge rectifier 38 converts the three-phase alternating voltage output from the stator winding 17 to a direct voltage output at the terminal 54, with respect to ground.

The DC voltage at the terminal 54 is supplied to a load point 56 (via a conductor 57) where a starter 60 and a battery 62 are connected. A lumped resistance 64 represents the resistance of the connections at the load point 56 as well as the resistance associated with the wire 57. The terminal 54 is also connected to a GO (generator output) terminal of the voltage regulator 22. The GO terminal serves as the input power terminal for the voltage regulator 22, providing the voltage for powering the internal circuits of the voltage regulator 22 and also serves as one point for measuring the generator output voltage for controlling the field excitation current as discussed above. Typically, the voltage regulator 22, the alternator 15 and the bridge rectifier 38 are packaged as a single unit and thus the GO terminal is referred to as an internal sense point, i.e., internal to the alternator/regulator combination.

A key switch 72, connected between the load point 56 and the L and I terminals of the voltage regulator 22, is used by the operator to start the vehicle by closing the circuit between the battery 62 and the starter 60 by way of the voltage regulator 22. Also connected at the load point 56 are various vehicle loads shown generally by a reference character 66.

An external sense circuit (i.e., external to the alternator/generator combination, as distinguished from the internal sense point at the GO terminal) is provided at an S terminal of the voltage regulator 22, which is connected to the load point 56 (via a resistance 70). This connection provides a second point for measuring the generator output voltage and controlling the field excitation current in response thereto. The resistance 70 is shown as a lumped element, representing the distributed resistance associated with the external sense line 68, as well as resistances caused by contamination and grime deposits at the load point 56 and the S terminal. The external sense line 68 could be connected to locations other than the local point 56, e.g., the positive terminal at the battery 62.

The function of the P, I, L, and FM terminals of the voltage regulator 22 as shown in FIG. 1 are known to those skilled in the art and are not germane to the teachings of the present invention.

For regulating the field current, the voltage regulator 22 can use either the voltage at the external S terminal (responsive to the voltage at the load point 56 via the external sense line 68 and the resistance 70) or the voltage at the internal GO terminal (responsive to the alternator output voltage at the terminal 54). In one prior art vehicular application, the voltage regulator 22 uses only the generator output voltage, as measured at the GO terminal, to control the field excitation current as discussed above. In this embodiment, the external sense line 68 is not used nor is it connected to the load point 56. The disadvantage of this internal sense technique is that if the battery 62 is located a significant distance from the generator (in the trunk of the automobile, for instance) voltage drops in the wiring or terminals between the generator output (the terminal 54) and the battery 62 are not taken into account in controlling the field excitations. That is, the generator is producing a given output voltage, but a portion of that voltage is dissipated in the wires and terminals (the wire 57 and the resistance 64, for example) between the generator output (the terminal 54) and the battery 62, and therefore the full generator output voltage is not available to charge the battery 62. The battery 62 will therefore be continuously undercharged. If the battery 62 is mounted close to the generator, the intervening voltage drops are less significant, such that the sensed generator output voltage at the GO terminal and the actual battery voltage are approximately equal. Therefore, in that application, the GO terminal voltage is used to control field current excitation to the alternator 15. In any case, the S terminal is the preferred sense point because it more accurately represents the battery voltage.

In another prior art vehicular application, the voltage on the external sense line 68 connected between the S terminal and the load point 56, is used by the voltage regulator 22 (as measured at the S terminal) to control the field excitation current under certain conditions. In this prior art embodiment, approximately one or two milliamps of current is supplied to the external sense line 68 to ensure that the external sense line 68 does not float at an indeterminate voltage. This low current is used so as not to excessively load the battery 62, creating a so-called Kelvin connection between the battery 62 and the generator. This current is supplied by the battery 62 and limited by a resistor (not shown in FIG. 1) connected to ground. Corrosion and contamination on the sense line 68 or at the terminal points, can easily create resistances (as represented by the resistance 70) as high as hundreds of ohms. Given the current of one or two milliamps, these resistances create a voltage drop between the S terminal and the load point 56. Thus the voltage measured at the S terminal is the voltage at the load point 56 minus the voltage drop due to the lumped resistance 70. The sensed voltage at the S terminal does not accurately reflect the load point voltage if the voltage drop due to the lumped resistance 70 is excessive. As a result, the voltage at the GO terminal can exceed the S terminal voltage. To overcome this effect, if the voltage on the S terminal drops below a predetermined value, in one embodiment 4 volts, then the voltage regulator 22 begins to control the alternator 15 based on the voltage at the GO terminal, rather than the voltage present on the S terminal. However, before this switchover occurs, the voltage at the S terminal is lower than the voltage at the load point 56 due to the voltage drop on the external sense line 68. But, the voltage regulator 22 sees this lower voltage at the S terminal and raises the excitation current accordingly to increase the output voltage from the alternator 15. As the voltage drop along the external sense line increases, the voltage provided by the alternator 15 likewise increases, to the point where the alternator output voltage becomes excessive and can damage the battery 62, the alternator 15, or the loads 66. After the switchover, the internal sense voltage (at the GO terminal) may not accurately reflect the actual battery voltage if the battery 62 is located a significant distance from the generator (as discussed above).

It is the decision of the automobile manufacturer to use solely the GO terminal to control the field excitation current or to use the S terminal and switch to the GO terminal whenever the absolute S terminal value is outside a predetermined range.

It is therefore necessary to develop an improved technique for determining whether the voltage regulator 22 utilizes the voltage at the S terminal or the voltage at the GO terminal for controlling the field excitation. The voltage regulator 22 of the present invention continuously senses both the GO terminal and the S terminal voltages to determine if a predetermined relationship exists between the GO terminal and the S terminal voltages, and in response thereto determines which of the voltages to use for controlling the field excitation current. To accomplish this selection, according to one embodiment of the present invention, when the voltage regulator 22 is sensing from the S terminal, the S terminal voltage is compared (for example, with a comparator) with an absolute threshold low value and is also compared with the difference between the GO terminal voltage and an offset threshold low value. If either one of these conditions is true, then a failsoft condition has been detected and the voltage regulator 22 begins using the GO terminal voltage for regulating purposes.

Whenever the voltage regulator 22 is using the voltage at the S terminal for regulation but the voltage at the GO terminal exceeds a predetermined value, then this too indicates an undesirable operating condition and in response the voltage regulator 22 immediately turns off the field excitation current. In turn, the output from the alternator 15 goes to zero and a potentially damaging situation is avoided. This latter scheme is intended to provide failsafe protection for the battery 62 and the loads 66 in the event that the differential sensing feature does not detect a problem.

FIGS. 2 through 5 illustrate software flowcharts for implementing the teachings of the present invention in a software embodiment, specifically, the failsoft and failsafe conditions. The flowcharts can be executed by a dedicated microprocessor within the voltage regulator 22 or on a time sharing basis by another microprocessor within the vehicle. In yet other embodiments, a dedicated micro-controller or a custom integrated circuit within the voltage regulator or vehicle can execute the software code represented by the FIGS. 2 through 5 flowcharts.

Figure 2:
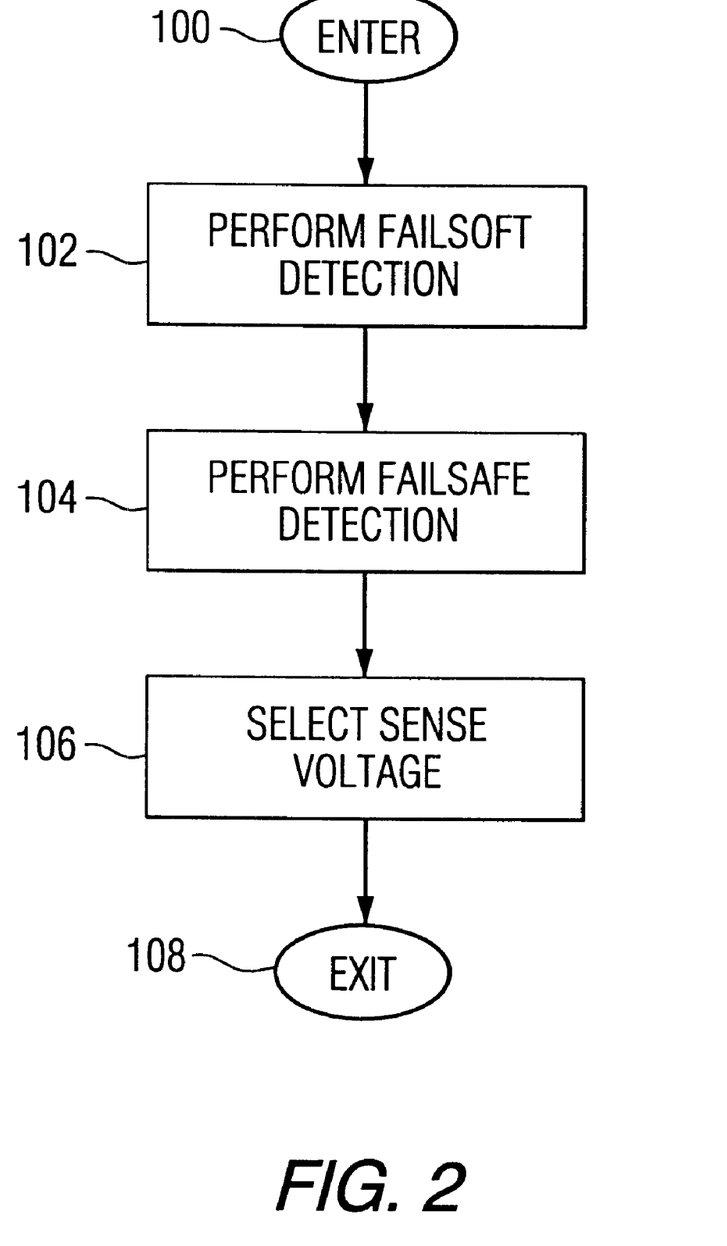
FIGS. 2 through 6 are software flow charts illustrating an implementation of the present invention.

The FIG. 2 flowchart, which is executed a few hundred times per second (400 times per second in one embodiment) begins at an enter step 100. Steps 102, 104 and 106 represent three subroutines that are executed for controlling the voltage regulator 22. The steps 102 and 104 perform the failsoft and failsafe detection processes respectively, as will be discussed further hereinbelow. The process represented by the step 102 determines when a failsoft condition exists and in response thereto, sensing occurs at the GO terminal. The step 104 detects a failsafe condition. That is, if the voltage regulator 22 is sensing from the S terminal (external sense) while the GO terminal goes above a predetermined value, then this indicates that a problem has developed in the circuit between the S terminal and the battery. In response thereto, sensing switches over to the GO terminal. The steps 106 determines which of the two measured voltages (the voltage at the S terminal or the voltage at the GO terminal) is utilized by the voltage regulator 22 for controlling the alternator 15 as discussed above. The FIG. 2 flowchart ends at an exit step 108.

Figure 3:
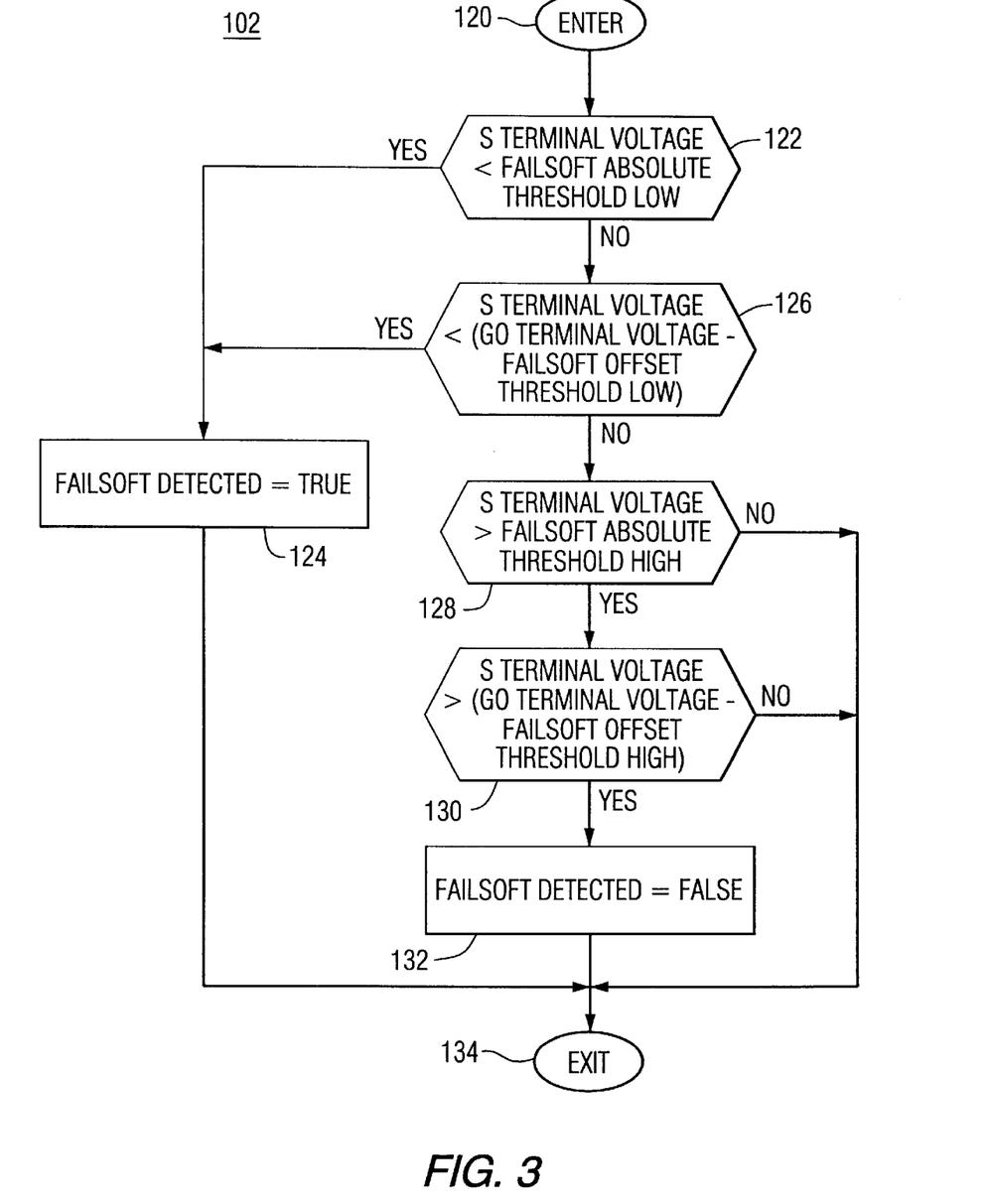

The step 102 is shown in greater detail in FIG. 3, where the software execution process begins at an enter step 120. The process next moves to a decision step 122 for comparing the S terminal voltage with a failsoft absolute low threshold voltage. If the S terminal voltage is below the absolute threshold low voltage, the result from the decision 122 is affirmative, indicating that a failsoft condition exists, as shown at a step 124, e.g., the S terminal may be disconnected at the sensing point because the voltage drops (due to the resistance 70) in the sense line are excessive. If the response from the decision step 122 is negative, processing moves to a decision step 126 where the S terminal voltage is compared to the difference between the GO terminal voltage and a failsoft offset low threshold voltage. Here again, if the result is true, a failsoft condition has been detected and processing moves to the step 124 where the failsoft flag is set to true.

If the result from the decision step 126 is negative, processing moves to a decision step 128 where the S terminal voltage is checked to determine if it is greater than a failsoft absolute threshold high voltage. If the result is affirmative, processing then moves to a decision step 130 where the S terminal voltage is compared to the difference between the GO terminal voltage and the failsoft offset high threshold voltage. If the result is affirmative, then the failsoft detected flag is set to false, as shown at a step 132. This false flag value indicates that sensing from the S terminal is permitted. If either of the decision steps 128 or 130 result in a negative answer, processing moves to an exit step 134. Processing also reaches the exit step 134 following the steps 124 and 132 where the failsoft flag is set.

The software flowchart of FIG. 3 in essence represents the implementation of a hysteresis situation. The S terminal voltage must fall below a certain absolute value (the decision step 122) or a differential value (the decision step 126) to detect a failsoft condition. The S terminal voltage must exceed another absolute value (the decision step 128) and a differential value (the decision step 130) to indicate that a failsoft condition has not occurred. Otherwise, the sensing point does not change. The use of this hysteresis technique reduces oscillations between failsoft detected and failsoft not detected in the event the system is on the edge of a valid range for the resistance 70. If the resistance 70 exceeds a certain value, the failsoft condition will be detected.

Figure 4:
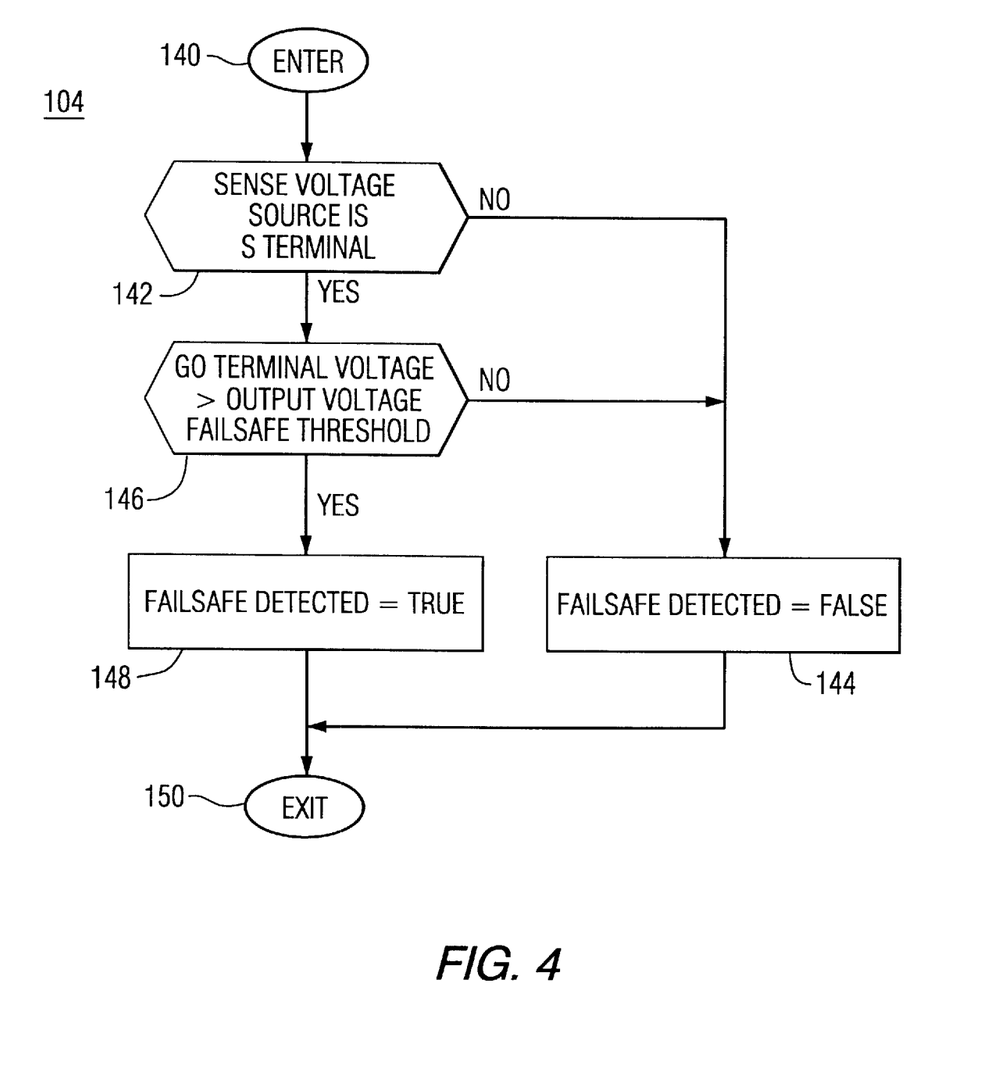

The FIG. 4 software flowchart illustrates the details of the failsafe detection process identified by the step 104 in FIG. 2. The FIG. 4 process begins at an enter step 140 and continues to a decision step 142 where a determination is made whether the sense voltage source is the S terminal. If the result is no, then a failsafe condition cannot be detected since that condition occurs only when the S terminal is the sense point. As a result, processing moves from the decision step 142 to a step 144 where the failsafe detected flag is set to false. Returning to the decision step 142, if the result is affirmative, then processing moves to a decision step 146 where the GO voltage is compared to an output voltage failsafe threshold. If the comparison determines that the GO terminal voltage is less than the threshold, then the failsafe detected flag is set to false at the step 144. If the response from the decision step 146 is true, a failsafe condition has been detected and the failsafe detected flag is set to a true state at a step 148. This indicates a fault in the S sense circuit because the GO terminal (which is not the voltage sense point) has risen above an over-voltage value. Following the steps 144 and 148, processing exits the FIG. 4 flowchart at an exit step 150.

Figure 5:
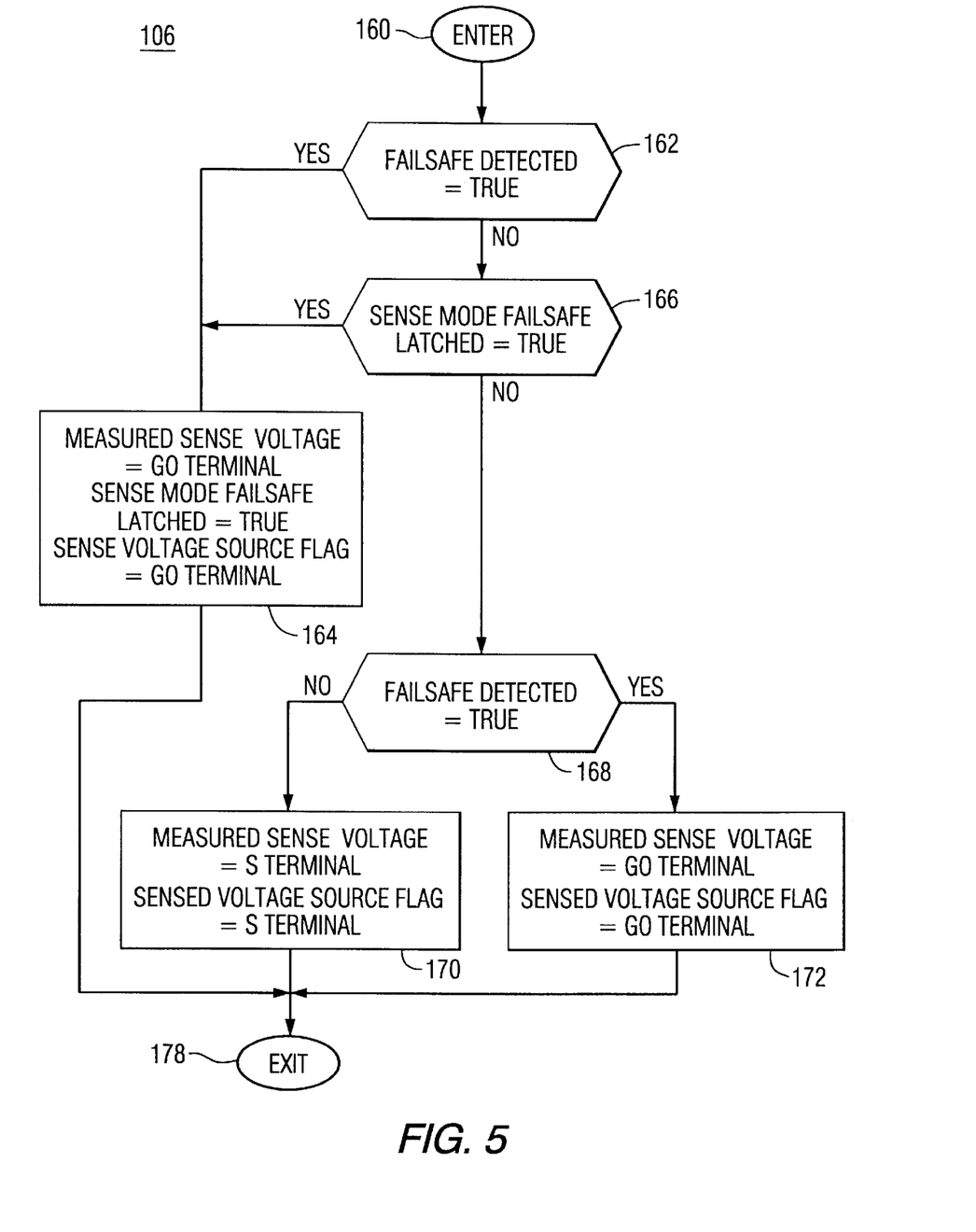

The FIG. 5 flowchart illustrates in detail the step 106 shown in FIG. 2.

The FIG. 5 flowchart begins at an enter step 160 and proceeds to a decision step 162 where the failsafe detected flag is checked. If the flag is true (having been set at the step 148 of FIG. 4) then processing moves to a step 164 where the measured sense voltage is set equal to the GO terminal voltage and the sense mode failsafe latched flag is set to true. This indicates that the voltage regulator 22 is latched in the failsafe mode. When latched in the failsafe mode, the voltage regulator 22 cannot be reset until predetermined conditions are satisfied (the vehicle is shut off or the battery is disconnected). Finally at the step 164, the sense voltage source flag is set equal to the GO terminal.

Returning to the decision step 162, if the failsafe detected flag is not true, processing moves to a decision step 166 where the sense mode failsafe latched flag is checked. If this flag is true, then processing again moves to the step 164, which simply maintains the latched failsafe condition. If the decision step 166 results in a negative response, then processing moves to a decision step 168. Here the failsoft flag is checked. If that flag value is false, processing moves to a step 170 where the measured sense voltage value is set equal to the S terminal voltage and the sense voltage flag source is identified to be the S terminal. If a failsoft condition was detected because the failsoft flag is true, then following the decision step 168 processing moves to a step 172 where the sense measured voltage is set equal to the GO terminal voltage and the sense voltage source flag is identified as the GO terminal. The only difference between the step 172 and the step 164 is that the voltage regulator 22 is not latched in the failsoft mode at the step 172. If the condition causing the occurrence of the failsoft event later goes away, the voltage regulator 22 can return to a normal operational state. Recall that the FIG. 2 flowchart is executed several hundred times per second such that the change or disappearance of this condition is detected at the next execution and the lack of a failsoft event detected.

The FIG. 5 process moves to an exit step 178 following the steps 164, 170 and 172.

Figure 6:
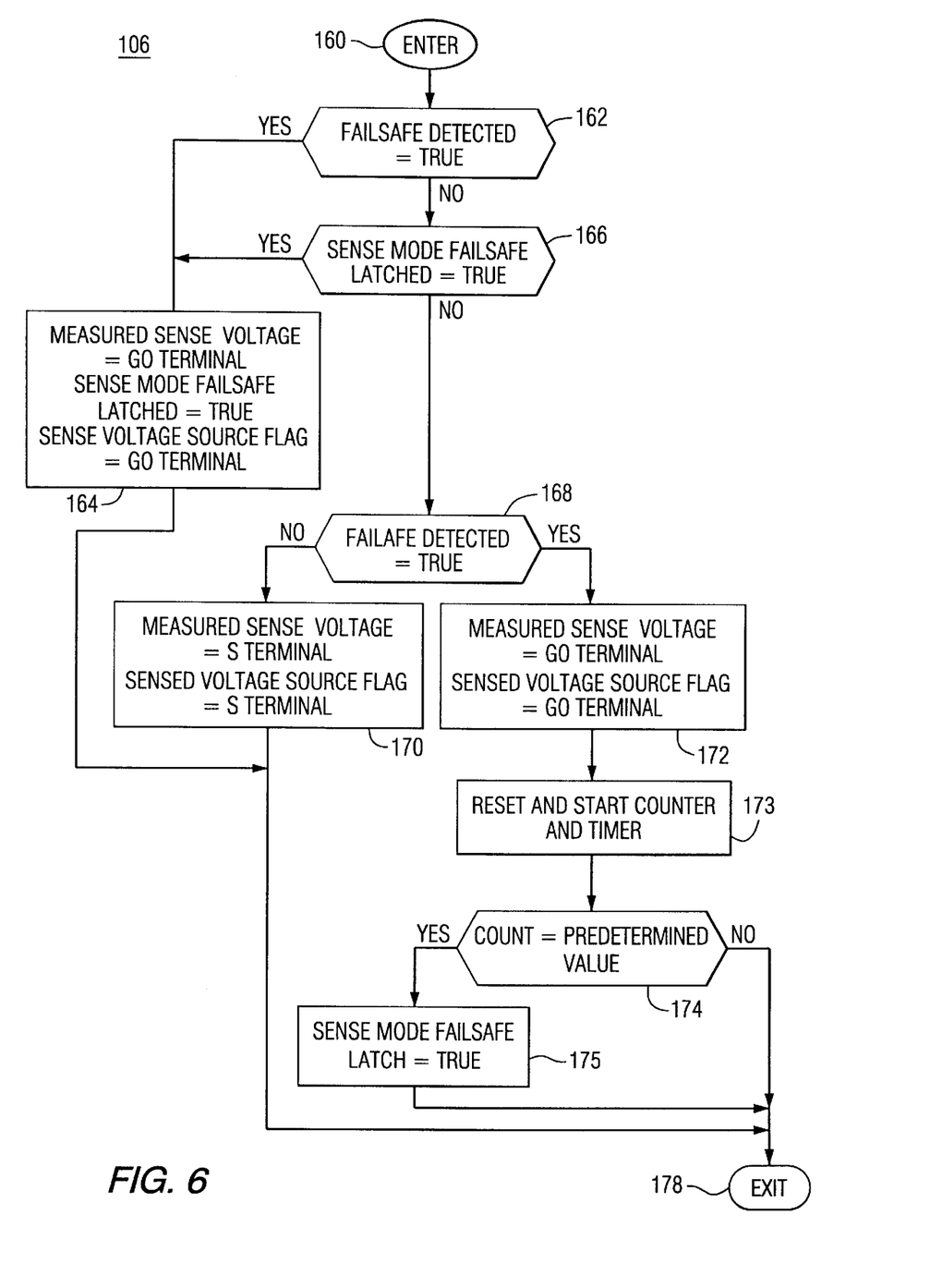

In another embodiment, a software counter and timer is interposed in the affirmative output path from the decision step 168. See FIG. 6. If a significant number of failsoft events occur in a given time interval, an intermittent condition may be at fault and thus it may be preferable to latch in the failsoft mode, rather than switching repeatedly between failsoft operation and normal operation. The software counter counts the number of failsoft events during a predetermined time interval measured by a timer. See a step 173 of FIG. 6. If the counter reaches a predetermined value in the predetermined time period, as indicated at a decision step 174, then the software process latches the voltage regulator in the failsoft mode as shown at a step 175.

When the voltage regulator 22 is sensing from the GO terminal, if the GO terminal voltage exceeds a predetermined threshold the output field current goes to a fixed duty cycle value. Typically, the field current is supplied in the form of a variable duty cycle square wave. The effective value of the field current is therefore established by changing the duty cycle. If the GO terminal voltage cannot be controlled within predetermined limits, and it exceeds an over-voltage threshold, then the field current is shut off. Also, if the GO terminal voltage remains above the over-voltage threshold for a predetermined time, the voltage regulator 22 presents a fault indication to the vehicle operator.

While the invention has been described with reference to a preferred embodiment, it will be understood by those skilled in the art that various changes may be made and equivalent elements may be substituted for elements thereof without departing from the scope of the present invention. In addition, modifications may be made to adapt a particular situation more material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A voltage regulator for a vehicle engine generator, wherein the generator is drivingly coupled to the vehicle engine, the generator having a field coil and an output winding for producing an output voltage in response to the field coil current, said voltage regulator comprising:

a current source for providing the field current in selectable response to a first sensed voltage proximate the generator output or to a second sensed voltage at another point on the vehicle; and a comparator for determining whether a predetermined relationship exists between the first sensed voltage and the second sensed voltage, wherein said current source is responsive to the first sensed voltage when the predetermined relationship exists.

2. The voltage regulator of claim 1 wherein the predetermined relationship comprises the second sensed voltage less than a predetermined absolute low threshold voltage.

3. The voltage regulator of claim 1 wherein the predetermined relationship comprises the second sensed voltage less than the difference between the first sensed voltage and a predetermined offset low threshold voltage.

4. The voltage regulator of claim 1 wherein the predetermined relationship comprises the second sensed voltage less than a predetermined absolute low threshold voltage or the predetermined relationship comprises the second sensed voltage less than the difference between the first sensed voltage and a predetermined offset low threshold voltage.

5. The voltage regulator of claim 4 wherein if the predetermined relationship occurs a predetermined number of times during a predetermined interval, then the current source is latched and thereafter responsive only to the first sensed voltage.

6. The voltage regulator of claim 1 wherein when the predetermined relationship does not exist and the second sensed voltage is greater than a predetermined absolute high threshold voltage then the current source is responsive to the second sensed voltage.

7. The voltage regulator of claim 1 wherein when the predetermined relationship does not exist and the second sensed voltage is greater than the difference between the first sensed voltage and a predetermined offset high threshold voltage, then the current source is responsive to the second sensed voltage.

8. The voltage regulator of claim 1 wherein when the predetermined relationship does not exist and the second sensed voltage is greater than a predetermined absolute high threshold voltage or when the second sensed voltage is greater than the difference between the first sensed voltage and a predetermined offset high threshold voltage, then the current generator is responsive to the second sensed voltage.

9. The voltage regulator of claim 1 wherein when the current source is responsive to the second sensed voltage, and wherein when the first sensed voltage exceeds a failsafe threshold voltage then the current source becomes responsive to the first sensed voltage.

10. The voltage regulator of claim 1 wherein the voltage regulator is latched in a failsafe mode when the current source is responsive to the second sensed voltage, and wherein the first sensed voltage exceeds a failsafe threshold voltage.

11. The voltage regulator of claim 1 wherein the vehicle includes a battery, wherein the vehicle engine generator charges the battery, and wherein the point on the vehicle where the second sensed voltage is measured is at the positive battery terminal.

12. A voltage regulator for a vehicle engine generator, wherein the generator is drivingly coupled to the vehicle engine, the generator having a field coil and an output winding for producing an output voltage in response to the field coil current, said voltage regulator comprising:

a current source for providing the field current in selectable response to a first sensed voltage proximate the generator output or to a second sensed voltage at another point on the vehicle;

a first module for producing a first signal if the second sensed voltage is less than a predetermined absolute low threshold voltage or the second sensed voltage is less than the difference between the first sensed voltage and a predetermined offset low threshold voltage;

wherein said current source is responsive to the first sensed voltage in response to said first signal;

a second module for producing a second signal if the second sensed voltage is greater than a predetermined absolute high voltage;

wherein said current source is responsive to the second sensed voltage in response to said second signal;

a third module for producing a third signal if the second sensed voltage is greater than the difference between the first sensed voltage and a predetermined offset high threshold voltage;

wherein said current source is responsive to the second sensed voltage in response to said third signal;

a fourth module for producing a fourth signal if said current source is responsive to the second sensed voltage and the first sensed voltage exceeds a failsafe threshold voltage;

wherein said current source is responsive to the first sensed voltage in response to said fourth signal.

13. The voltage regulator of claim 12 wherein in response to the fourth signal, the voltage regulator is latched in a failsafe condition, such that sensing continues using the first sensed voltage.

14. The voltage regulator of claim 12 further comprising a fifth module responsive to the first signal for determining if the first signal is produced a predetermined number of times during a predetermined time interval, and for latching the voltage regulator in a failsoft condition in response thereto, such that sensing continues using the first sensed voltage.

15. A method for controlling a vehicle engine generator, wherein the generator is drivingly coupled to the vehicle engine, the generator having a field coil and an output winding for producing an output voltage in response to the field coil current, and wherein the field coil current is selectively responsive to a first sensed voltage at the generator output or to a second sensed voltage at another point on the vehicle, said method comprising the steps of:

(a) determining whether a predetermined relationship exists between the first sensed voltage and the second sensed voltage; and (b) controlling the field coil current in response to the first sensed voltage when the predetermined relationship exists.

16. A method for controlling a vehicle engine generator, wherein the generator is drivingly coupled to the vehicle engine, the generator having a field coil and an output winding for producing an output voltage in response to the field coil current supplied by a current source, and wherein the field coil current is selectively responsive to a first sensed voltage at the generator output or to a second sensed voltage at another point on the vehicle, said method comprising:

(a) determining if a first condition exists, wherein the first condition is the second sensed voltage is less than a predetermined absolute low threshold voltage, wherein the current source is responsive to the first sensed voltage when the first condition exists;

(b) determining if a second condition exists, wherein the second condition is the second sensed voltage is less than the difference between the first sensed voltage and a predetermined offset low threshold voltage, and wherein the current source is responsive to the first sensed voltage when the second condition exists;

(c) determining if a third condition exists, wherein the third condition is the second sensed voltage is greater than a predetermined absolute high voltage, and wherein the current source is responsive to the second sensed voltage when the third condition exists;

(d) determining if a fourth condition exists, wherein the fourth condition is the second sensed voltage is greater than the difference between the first sensed voltage and a predetermined offset high threshold voltage, and wherein the current source is responsive to the second sensed voltage when the fourth condition exists; and (e) determining if a fifth condition exists, wherein the fifth condition is the current source is responsive to the second sensed voltage and the first sensed voltage exceeds a failsafe threshold voltage, and wherein the current source is responsive to the first sensed voltage when the fifth condition exists.

17. An article of manufacture comprising:

a computer usable medium having computer-readable program code embodied therein for a method for controlling a vehicle engine generator, wherein the generator is drivingly coupled to the vehicle engine, the generator having a field coil and an output winding for producing an output voltage in response to the field coil current supplied by a current source, and wherein the field coil current is selectively responsive to a first sensed voltage at the generator output or to a second sensed voltage at another point on the vehicle, comprising:

a computer-readable program code module for determining if a first condition exists, wherein the first condition is the second sensed voltage is less than a predetermined absolute low threshold voltage, wherein the current source is responsive to the first sensed voltage when the first condition exists;

a computer-readable program code module for determining if a second condition exists, wherein the second condition is the second sensed voltage is less than the difference between the first sensed voltage and a predetermined offset low threshold voltage, and wherein the current source is responsive to the first sensed voltage when the second condition exists;

a computer-readable program code module for determining if a third condition exists, wherein the third condition is the second sensed voltage is greater than a predetermined absolute high voltage, and wherein the current source is responsive to the second sensed voltage when the third condition exists;

a computer-readable program code module for determining if a fourth condition exists, wherein the fourth condition is the second sensed voltage is greater than the difference between the first sensed voltage and a predetermined offset high threshold voltage, and wherein the current source is responsive to the second sensed voltage when the fourth condition exists; and a computer-readable program code module for determining when a fifth condition exists, wherein the fifth condition is the current source is responsive to the second sensed voltage and the first sensed voltage exceeds a failsafe threshold voltage, and wherein the current source is responsive to the first sensed voltage when the fifth condition exists.

* * * * *